Sept. 9, 1969    S. ALLINIKOV ETAL    3,466,220
EXPANDABLE SELF-RIGIDIZING HONEYCOMB STRUCTURE
Filed March 23, 1965    2 Sheets-Sheet 1

INVENTORS
FRED W. FORBES
SIDNEY ALLINIKOV
BY
ATTORNEYS

Sept. 9, 1969  S. ALLINIKOV ET AL  3,466,220
EXPANDABLE SELF-RIGIDIZING HONEYCOMB STRUCTURE
Filed March 23, 1965  2 Sheets-Sheet 2

INVENTORS
FRED W. FORBES
SIDNEY ALLINIKOV
BY
ATTORNEYS

United States Patent Office 3,466,220
Patented Sept. 9, 1969

3,466,220
EXPANDABLE SELF-RIGIDIZING HONEYCOMB STRUCTURE
Sidney Allinikov, 1109 Xenia Ave., Yellow Springs, Ohio 45387, and Fred W. Forbes, 533 Murray Hill Drive, Xenia, Ohio 45385
Continuation-in-part of application Ser. No. 277,985, May 2, 1963. This application Mar. 23, 1965, Ser. No. 444,927
Int. Cl. B32b 3/12, 17/10
U.S. Cl. 161—68                    5 Claims

ABSTRACT OF THE DISCLOSURE

An initially small, compact, lightweight body which is inflatable and expandable by internal pressure to a much larger rigidized structure of predetermined shape and size having inner and outer expandable or elastomer skins, with an expandable honeycomb core sandwiched therebetween, and a rupturable encapsulated adhesive means sandwiched between the facing sheet-like elastomer skins and the adjacent edges or sides of the expandable honeycomb structure to automatically release the cement under inflation and expansion pressure and secure the adjacent surfaces of the expanded skins to the contacting edges of the intermediate expanded honeycomb structure, to form an expanded rigidized honeycomb and wall sandwich structure of predetermined size and shape when inflated by internal pressure which will not collapse when subsequently punctured or upon leakage of the inflation medium.

Figure 1:
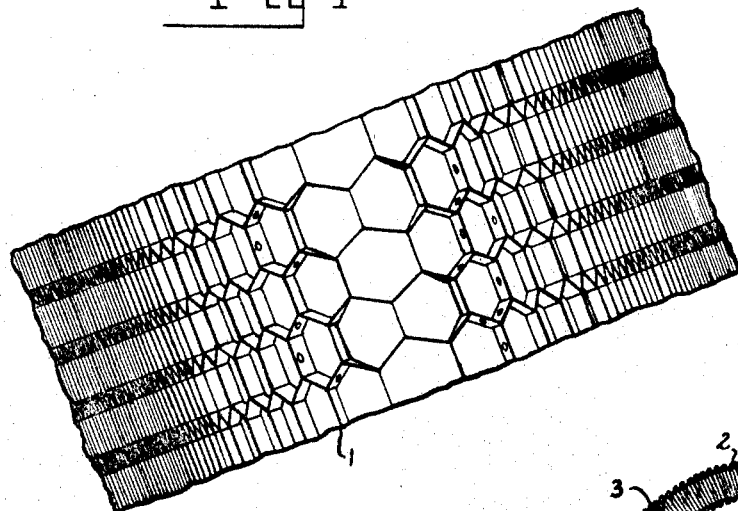

Another form provides a hollow expandable self-rigidizing structure which is greatly expanded by internal pressure and automatically rigidized in its expanded condition to prevent collapse upon puncture and escape of the internal pressure or inflation medium.

The expandable structure is made of an expandable honeycomb core made of aluminum foil sheets, which are initially collapsed with inner and outer extensible or elastomer impervious skins or walls that are aluminized, thin and tough, and expandable by internal pressure and include an encapsulated adhesive compound coating, such as epoxy cement or glue which is disposed between the elastomer impervious skins and the edges of the intermediate core which release the adhesives by expansive contact pressure between the skins and the honeycomb core, and automatically cement the core and skins together into an expanded integral, non-collapsible, hollow unit.

In another form, the expansible hollow body is impregnated with a plasticizer "boil-off" material which, after expansion and exposure, migrates away to cause the expanded hollow body to become rigidized.

In another form, the hollow inflatable core is made of woven glass fibers which are impregnated by a compound such as epoxy resin, urethane and polyester in a flexible state and expanded and rigidized by internal pressure by a vaporized catalyst selected from a group that consists of an amine, water, and dibutyl tin ethyl hexoate, disbursed in the inflation medium.

---

The invention described herein may be manufactured and used by or for the United States Government for governmental purposes without payment to us of any royalty thereon.

This application is a continuation-in-part of U.S. patent application Ser. No. 277,985, filed May 2, 1963, for Expandable Self-Rigidizing Honeycomb Structure, now abandoned, and relates to a hollow self-rigidizing, expandable structure, and to the process by which it is made, expanded, and rigidized.

Expandable useful structures of initially small volumes and compactness, for the purpose of transportation and initial handling, which are expanded by internal pressure to their much greater predetermined operative and useful size and shape, include tents, balloons, and nonrigid airships. However, they are not rigidized and are subject to collapse upon puncture and escape of the internal pressure or inflation medium.

Lightweight honeycomb structures are well known, composed of honeycomb aluminum sheet or thin stiff honeycomb foil cores which are sandwiched between inner and outer thin aluminum alloy foil sheets with the edges of the honeycomb structure or core securely fastened, as by adhesives, to the facing surfaces of the outer sheets, and provides very rigid and strong structures or panels. However, these are not capable of an initial compact small condition, nor are they expandable by internal pressure and automatically rigidized in their intended expanded structural condition, for instance by an internal pressure medium.

An object of this invention is the provision of a new and improved inflatable and expandable self-rigidizing honeycomb structure that is initially small, compact, and light in weight, but is inflatable and expandable by internal pressure to a much larger rigidized structure of predetermined shape and size, having inner and outer sheet-like extended or expanded walls or elastomer skins with a substantially stiff expanded honeycomb core sandwiched therebetween, and rupturable capsulated adhesive means sandwiched between the facing sheet-like elastomer walls and the edges or sides of the honeycomb core structure for automatically cementing the adjacent surfaces of the walls to the contacting edges of the honeycomb structure to form an expanded rigidized honeycomb and wall structure of predetermined size and shape.

A further object of the invention includes the provision of an expandable flexible outer wall for surrounding an annular inner space, comprising a compact expandable honeycomb wall structure having an inner edge portion facing and surrounding said space and expandable to much greater predetermined size for surrounding a much greater annular space or area, with an inner elastomer bladder-like member surrounded by the honeycomb wall, for expanding the same to its predetermined shape and size upon inflation and expansion of said bladder-like member and a plasticizer coating having boil off characteristics when exposed to a partial vacuum comprising a coating between the elastomer bladder member and the surrounding honeycomb wall for rigidizing the expanded structure upon exposure thereof to a partial vacuum in outer space.

A further object is the method of rigidizing a hollow flexible expanded body comprising a hollow expandable core and an inner elastomer skin, which comprises impregnating the body with a plasticizer boil-off with a material from the group comprising plasticized gelatin, vinyl, wherein the plasticizer is employed with a material selected from the group consisting of water, glycerine, sorbital, dioctyl phthalate and tricresyl phosphate, whereby after expansion and exposure the plasticizer migrates away from the expanded structure to cause rigidization thereof.

A further object is the method of rigidizing a hollow inflatable core of woven glass fibers by a compound selected from a group that consists of epoxy resin, urethane, and polyester in a flexible state, and expanding and rigidizing the expanded structure by internal pressure with a vaporized catalyst selected from the group that consists of an amine, water, and dibutyl tin ethyl hexoate, dispersed in the inflation medium.

A further object is the method of rigidizing a hollow inflatable and expandable body comprising inner and outer elastomer aluminized foil skins with an expandable honeycomb core therebetween in contact with the inner and outer surfaces of the outer and inner elastomer skins, which comprises disposing a capsulated adhesive between the inner and outer surfaces of said outer and inner skins and the respective outer and inner edges of the expandable honeycomb core, whereby expansion of the inner elastomer skin expands the honeycomb core and the outer skin to rupture and release the capsulated adhesive medium therebetween to cause adhesion between the inner and outer skins and the expanded honeycomb core to effect rigidification of the expanded structure.

When reference is made to honeycomb core it is intended to embody sandwiched construction consisting of two skins separated by hexagonal cores, corrugated cores, or (woven) fibrous cores. These skin and core materials may or may not be woven in one piece.

Examples of the initially small compact, and expandable and automatically rigidized structure of the invention having predetermined expanded contours and size may be a cylinder with a conical roof, a flat circular floor and door, a hollow sphere, a torus or the like used, for instance, as: a satellite, manned or unmanned; a shelter; a support for a collector of solar energy or the relay of transmitted energy; a reentry vehicle; extraterrestrial structures; terrestrial structures, etc. However, for purposes of illustration, a sphere, or a cylinder, or round structure is specifically schematically shown and described, like reference characters referring to like parts in the several figures of the drawings in which:

FIG. 1 is a fragmentary side elevational view of a cylindrical portion of a honeycomb core such as employed in the invention, showing more particularly the outer edges and structure of a portion of the expandable honeycomb core or web structure with the right and left ends thereof either unexpanded or only slightly expanded, but with the intermediate portion fully expanded to its maximum predetermined extent, showing vents in the webs, for instance, to provide vents between the cells when the core is sandwiched between inner and outer expandable or elastomer wall sheets.

Figure 2:
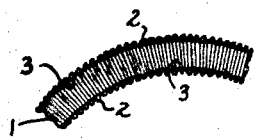

FIG. 2 is a fragmentary edge view of a circular portion, for instance, of a cylinder, schematically showing the honeycomb core in compact, nonexpanded condition, and also illustrating the inner and outer elastomer or extensible foil skins or walls having adhesive means, such capsulated pressure rupturable adhesive release responsive coatings on the facing surfaces of the inner and outer skins. In this form the outer skin may limit the expansion and extension or shape of the core while the inner skin may be impervious and inflatable like a bladder to expand the honeycomb core and apply pressure to force the adjacent faces or walls of the inner and outer skins toward the edges of the honeycomb structure to rupture and release the capsulated adhesive, for automatically coating the adjacent edges of the core and the walls or skins, to bind the core and skins together to provide an expanded and rigidized sphere, or article of predetermined size and shape, of the class described.

Figure 3:
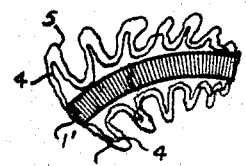

FIG. 3 is a fragmentary edge view of a curved portion of a cylinder, or section through the wall of a sphere, showing the honeycomb core in compact or initially collapsed condition, like in FIG. 2, however, showing the flexible inner and outer extensible skins or walls collapsed, and depicting the capsulated adhesive coating on the adjacent surfaces of the walls between the inner and outer edges of the honeycomb core before the inflation and expansion of the structure, which is necessary to bring the capsulated adhesives into rupturing contact with the edges of the honeycomb core by inflation pressure to provide an expanded automatically rigidized structure, as contemplated.

Figure 4:
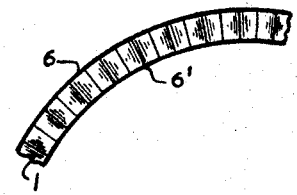

FIG. 4 is also a schematic fragmentary end view of a portion of a cylinder, similar to that shown in FIGS. 2 and 3, but illustrating the structure expanded to its predetermined shape and maximum size, as limited by the outer wall or skin or by the expansion or extension limit of the honeycomb core, to cause rupture of the capsulated adhesive medium or coating on the walls by the pressure between the edges of the honeycomb core and the walls, for releasing the adhesive to cement the walls and the honeycomb together to rigidize the structure in its expanded or extended condition, as contemplated.

Figure 5:
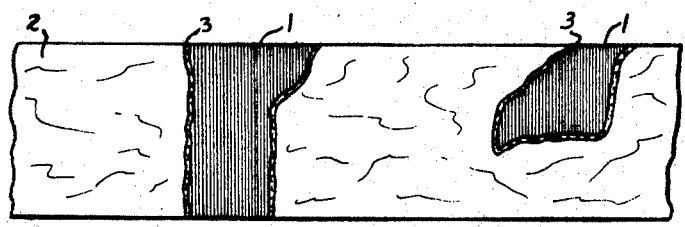

FIG. 5 is an enlarged fragmentary elevation view of the wall structure as shown in FIG. 2, prior to the expansion or extension thereof, with portions of the nearer extensible or elastomer wall of aluminized film or skin broken away to show portions of the intermediate honeycomb structure seen in FIG. 1 in its compact or unexpanded state, as seen also in FIGS. 2 and 3.

Figure 6:
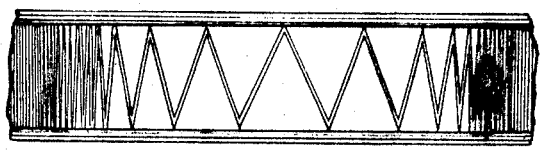
Figure 7:
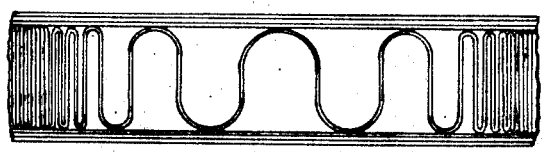
Figure 8:
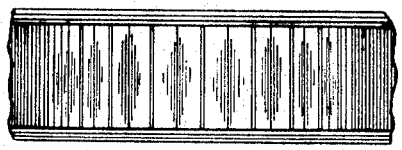
Figure 9:
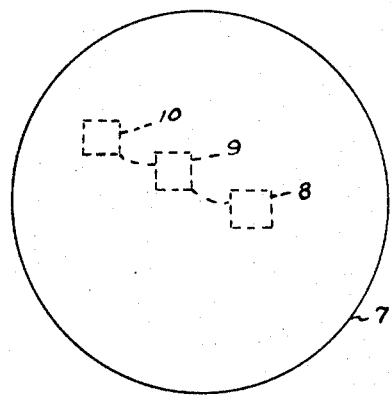

FIGS. 6, 7 and 8 are fragmentary enlarged views of commercially available types of honeycomb material, sold under the name Raypan, and FIG. 9 is a schematic view of an expanded spherical body having a wall structure made according to the invention, diagrammatically depicting in dotted lines, as block diagrams, the inflation means inside of the expandable spherical body, for effecting the inflation and expansion of the body and the subsequent rigidizing of the composite honeycomb core and the elastomer or extensible inner and outer wall or skin structures according to the invention.

The expandable honeycomb core, schematically illustrated in the drawing is made of aluminum foil sheets collapsed together as seen in FIGS. 2, 3 and 5, although the honeycomb core may be made of other materials such as paper, fiberglass, steel, and plastics such as vinyl chloride, vinyl acetate, a polyamide, a polyurethane, or the like, paper honeycomb structure may be used when impregnated with a suitable stiffening plastic.

In the drawings the honeycomb core is indicated at 1 in FIG. 1 with an intermediate portion fully expanded and with the extremities or spaced portions at opposite sides not fully expanded, and also shown in FIGS. 2, 3 and 5 in the initially compact condition, while in fully extended or expanded condition in FIG. 4. The reference numerals 2 denote the inner and outer extensible or elastomer skins or walls which may, and preferably are, aluminized and comparatively thin and tough as well as extensible with the honeycomb core, and are preferably impervious and inflatable from within the expand the same to the predetermined size and shape as determined by the limit of expansion of the honeycomb core 1, or by the elastomer walls or skins 2. Interposed between the skins or walls 2 and the outer and inner edges of the honeycomb core 1 is an encapsulated adhesive coating or layer 3 such as a cement or glue, which is rupturable by pressure between the walls 2 and the honeycomb 1 to release the adhesive therebetween to cement the inner surfaces of the skins 2 and the opposite sides of the expanded honeycomb structure firmly together, and thus provide an expanded, reformed, rigidized honeycomb structure of predetermined size and shape.

The capsulated adhesive 3 may be made by any known process, such as shown and/or described in U.S. patent to B. K. Green, 2,800,458 (Re. 24,899) and may employ epoxy resins with the constituents capsulated and mixed to provide the coatings. Of course, the coatings of the encapsulated adhesive 3, such as epoxy resins, can be secured to the surfaces of the skins 2 which face and contact the adjacent sides of the honeycomb structure 1, by any suitable means, such as any suitable adhesive to hold the coatings in place.

In FIG. 3 the collapsed honeycomb material is shown at 1' and is formed with inner and outer thin elastomer skins 5 with the inner or facing surfaces of the skins 5 provided with the coatings 4 of encapsulated adhesive materials.

In FIG. 4 the structures as shown in FIGS. 2 and 3 are depicted as fully expanded to their predetermined size and shape with the skins taut on both sides of the expanded honeycomb core and rigidized by the release of the adhesive and resulting adhesion between the core and the skins. In this figure the expanded honeycomb core is indicated at 1 while the expanded, or extensible outer and inner elastomer skins are indicated at 6 and 6' respectively with the ruptured and released capsulated adhesive coating between the core 1 and the inflated skins 6 and 6'.

As before mentioned, the end or final form of the expanded and rigidized structure may be substantially any shape, such as a canopy, a cylinder with closed ends, a sphere, a toroid, an airfoil, and other miscellaneous contours, however, the structure shown in FIG. 9 may be taken as illustrative, as comprising in its final expanded form, a hollow rigidized sphere 7 which may, in its initial compact or collapsed form, contain a bottle 8 of compressed or pressurized air or gas which is released by a suitable mechanism 9 which is actuated by a timer 10, an aneroid switch, or the like, actuated at a predetermined time, in a predetermined degree of vacuum or the like, to inflate and expand the device.

It is also contemplated that the device may be inflated automatically by the heat of the sun acting on a suitable material contained in the collapsed structure, such as anthraquinone in a measured quantity that sublimes at 286° C., and that is chemically nonreactive to the material of which both the honeycomb core and the inner and outer skins are made in this adaptation. For instance, the skins and core may be made of thin stainless steel. When the critical temperature (for instance 286° C.) is exceeded, the inflation material vaporizes to expand the structure to its predetermined size and shape.

The honeycomb core may be made of an elastomer that is sandwiched between two layers of skin that stick to the sides of the core upon the inflation of the device, the core being sandwiched between two coatings of aluminum foil, fiberglass, woven fabric of nylon, paper, or the like, with a layer of encapsulated adhesive of which "neoprene" is illustrative, interposed between the foil skins at both sides of the elastomer core and with or without an inflation material inside of the device.

The structure may also be inflated through an air valve, not shown, that is positioned in or at one end of the device. The inflation of the device to the sphere, torus, or the like shape expands and stretches the material of which it is made and causes the outer skin to act as a restraining force for the development of extremely high contact pressures along the edges of the honeycomb material. This force is high enough to rupture the capsules of adhesive to bond both the outer skin and the inner skin of aluminum foil to the honeycomb elastomer therebetween. The resulting device is rigidized.

The resultant structure has a high strength-to-weight ratio and has double walls for optimum micrometeorite protection and structural integrity.

If woven honeycomb or fiberglass core and skins are employed, rigidization of woven honeycomb and skins, as shown in FIGS. 2 and 3, is accomplished by perimpregating the fiberglass fabric with an epoxy, polyester, and urethane or gelatin. The resulting unrigidized structure is then packaged and is transported to a desired destination. At the final destination the structure is expanded by internal pressure as described previously. In addition to the normal pressurization media, a small amount, from about 1% to 10% by weight, of a vaporized catalyst, such as water, an amine, dibutyl tin ethyl hexoate, or the like, is allowed to be dispersed in the inflation media. The vaporized catalyst reacts with the preimpregnated resin and causes the structure to rigidize.

Another technique for rigidization is employed to rigidize the expanded honeycomb structures shown in FIGS. 2 and 3. This technique is known as plasticizer boil-off. The structure's core and skins are fabricated from an integrally woven fiberglass or metallic yarn. Once the core and skins are woven they are preimpregnated with a highly plasticized vinyl, gelatin, or urethane resin which, after curing, is as flexible as rubber. Examples of suitable plasticizers are water, glycerine, sorbital, dioctyl phthalate, tricresyl phosphate, and the like. The structure is then folded, packaged, and is shipped to a desired destination. The structure is expanded at the destination and the plasticizer migrates or evaporates, thus causing the structure to rigidize. It is recognized that the plasticizer boil-off technique is more successful for vacuum or extra terrestrial applications.

We claim:

1. An inflatable, expandable hollow body having an extensible wall adapted to define an annular chamber of predetermined size and shape, said wall comprising a first aluminized inflatable inner expandable skin, a compacted extensible honeycomb core surrounding said inner skin for limiting the expansion of said body, and an encapsulated adhesive compound coating sandwiched between said inner skin and said honeycomb core, rupturable by inflation pressure on said inner skin and said honeycomb core, to release said adhesive compound for coating the inner edges of said honeycomb core and the skin for securing the inner skin to the adjacent honeycomb core in its expanded condition, to rigidize the inflated body against collapse incident to escape of inflation pressure from within said body.

2. An inflatable, expandable, contracted body having an extensible wall adapted to define an annular chamber of predetermined size and shape when expanded, said wall comprising inner and outer extensible skins and an expandable honeycomb core sandwiched therebetween for controlling the expansion of said body to said predetermined size and shape, and an encapsulated adhesive coating sandwiched between each of said skins and the adjacent inner and outer sides of the honeycomb core, rupturable by inflation pressure expanding said body to force said skins and core together for releasing said adhesive to coat the adjacent surfaces of the skin and the edges of said honeycomb core with adhesive for securing the expanded skins and core to each other to rigidize the expanded body against collapse, incident to escape of internal pressure from within said body.

3. An inflatable and expandable honeycomb structure comprising a flexible elastomer honeycomb core enclosure defining an enlarged closed chamber of predetermined size and shape when expanded, an inner extensible compact foil skin next to inner surface of the honeycomb core enclosure wall, an outer extensible foil skin next to outer surface of said honeycomb enclosure core, a first layer of encapsulated adhesive disposed between said inner skin and said honeycomb core, and a second layer of encapsulated adhesive disposed between said honeycomb core and said outer skin, adapted to be ruptured by expansive force between said honeycomb core and said inner and outer skins, incident to expansion of said honeycomb structure, to release said adhesive to cause adhesion between the inner and outer edges of said core and skins to effect rigidization of said structure in its expanded condition.

4. An extensible self-rigidizing inflatable body comprising a compact flexible extensible inflatable bladder-like enclosure, expandable by internal pressure to enclose an annular enlarged space, comprising an expandable honeycomb core sandwiched between inner and outer flexible extensible skins, a coating of encapsulated pressure releasable adhesives interposed between the honeycomb core and the adjacent surfaces of said skins, and a vaporizable inflation medium disposed within said enclosure which vaporizes at 286° C., comprising anthraquinone, for inflating and expanding the structure to a predetermined size and shape, and rupturing and releasing the encapsulated adhesive between the core and skins and cement the same together when the temperature exceeds 286° C., to rigidize the inflated enclosure against collapse upon reduction or loss of said inflation medium.

5. A device as set forth in claim 4 in which the encapsulated adhesives comprises epoxy cement constituents in encapsulated forms.

References Cited

UNITED STATES PATENTS

| | | | |
|---|---|---|---|
| 2,557,434 | 6/1951 | Hoverder | 248—206 |
| 2,739,093 | 3/1956 | Bull | 156—81 XR |
| 2,952,129 | 9/1960 | Dempsey | 61—45 |
| 3,170,471 | 2/1965 | Schnitzer | 161—68 XR |
| 3,255,061 | 6/1966 | Dobbs | 156—79 |
| 3,098,563 | 7/1963 | Skees | 206—46 |
| 3,224,000 | 12/1965 | Bloetscher et al. | 244—1 XR |
| 3,256,649 | 6/1966 | Webb | 52—2 |
| 3,282,533 | 11/1966 | Spain | 161—17 XR |
| 3,291,333 | 12/1966 | House | 156—310 XR |
| 3,373,069 | 3/1968 | Gillespie | 156—292 XR |
| 3,405,886 | 10/1968 | Gosnell et al. | 156—305 XR |

HAROLD ANSHER, Primary Examiner

H. F. EPSTEIN, Assistant Examiner

U.S. Cl. X.R.

52—2; 156—197; 244—1